Jan. 23, 1945. C. H. TAYLOR Re. 22,594

SUCTION CLEANER

Original Filed Aug. 15, 1936 2 Sheets-Sheet 1

INVENTOR
Charles H. Taylor
BY
Harry S. Blumasse
ATTORNEY

Jan. 23, 1945. C. H. TAYLOR Re. 22,594

SUCTION CLEANER

Original Filed Aug. 15, 1936 2 Sheets-Sheet 2

INVENTOR

Charles H. Taylor

BY

Harry S. Dunarse

ATTORNEY

Reissued Jan. 23, 1945 Re. 22,594

UNITED STATES PATENT OFFICE 22,594

SUCTION CLEANER

Charles H. Taylor, Springfield, Mass., assignor to The Hoover Company, North Canton, Ohio, a corporation of Ohio Original No. 2,183,826, dated December 19, 1939, Serial No. 96,222, August 15, 1936. Application for reissue September 8, 1941, Serial No. 410,119

28 Claims. (Cl. 15—16)

This invention relates to improvements in suction cleaners and more particularly to an improved nozzle height adjusting mechanism for regulating the height of the nozzle of a suction cleaner above the surface to be cleaned. For the purpose of distinguishing the improved mechanism from the type previously in use it may be defined as semi-automatic in its operation, thus drawing a sharp line of distinction between the graduated raising and lowering of the nozzle manually by means of a graduated hand operated adjusting device and a device which automatically sets or regulates the height of the nozzle to an optimum position for the particular floor covering to be cleaned and solely upon the reception of an actuating force from the operator.

As is well known in the art of suction cleaning, the effectiveness of cleaner operation is dependent in a large measure upon the proper setting of the nozzle above the surface to be cleaned and the suitable height adjustment for one type of carpet or rug may not be correct for another type. Actually, then, it is only possible to maintain a high degree of cleaning effectiveness by resetting the nozzle adjustment for each kind or grade of floor covering to be cleaned. But heretofore such precise adjustment has been quite impossible and chiefly because the average operator has neither the knowledge or the patience needed to make them.

Without entering into a detailed discussion of the effect of nozzle height adjustment upon the efficiency of cleaner operation, it can be stated that for the average or ordinary grades of carpets and rugs, a constant setting of the suction nozzle will produce fairly satisfactory results. But with the existing trend toward a wide variation in kinds and textures of floor coverings, and with the known user disinclination to use an adjustment requiring care and judgment, it is practically impossible for the manufacturer to insure effective cleaning performance by providing manual nozzle height adjusting means. Cleaning effectiveness will vary most greatly in homes having carpets and rugs which differ considerably in thickness and depth of the pile and hence, the extent to which the wheels will sink into the nap.

The foregoing statement explains sufficiently the objection to prior nozzle height adjustments and also indicates the desirability of a so-called semi-automatic or self-regulating type of adjusting mechanism by means of which the cleaner is set to the proper operating nozzle height merely by the exertion of an actuating force and without exercise of judgment on the part of the operator. In other words, the operator merely performs the simple operation of pressing a lever and the nozzle adjusts itself to the proper height, this adjustment being gauged entirely by the character of the carpet on which the cleaner is resting at the time. Thus, with surfaces varying from a bare or linoleum covered floor to an extremely soft, thick-piled Chinese rug, it is possible to clean effectively by suction with a properly positioned nozzle all floor surfaces or coverings between these two extremes.

With this introduction a suction cleaner of the more or less standard type and design and equipped with the improved nozzle adjusting mechanism will now be described in connection with the accompanying drawings wherein.

Figure 1:
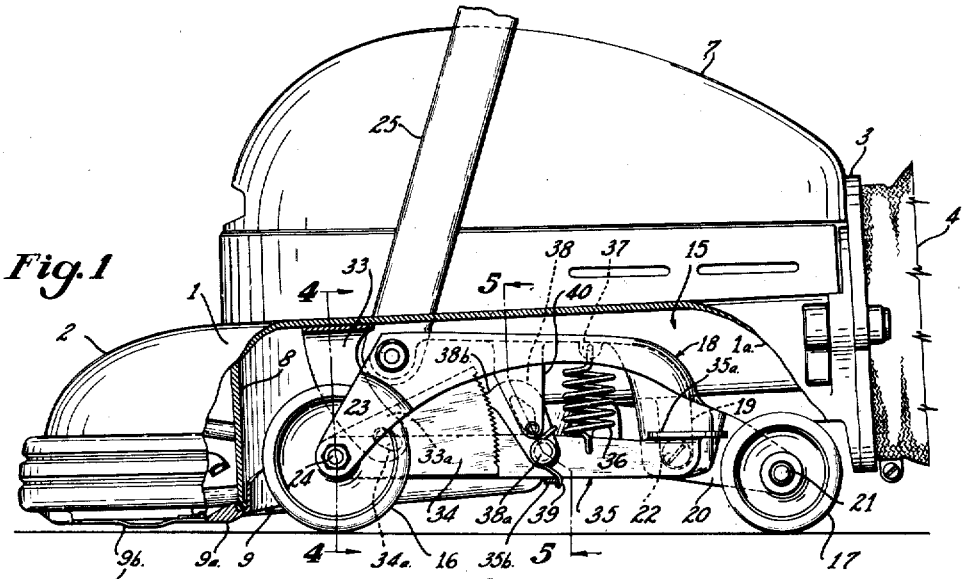
Figure 1 is a view in side elevation of a suction cleaner in its normal operating position and with a portion of the side wall broken away to show the supporting carriage or chassis and the nozzle adjusting mechanism associated therewith.

Referring to the cleaner in its general aspects the same comprises a main casing 1, having a nozzle portion 2, extending transversely of its forward end and having the form of an elongated chamber with a downwardly facing opening. The casing extends rearwardly from the nozzle portion, gradually converging to a rearwardly opening flanged outlet connection 3 to which is attached a dirt receptacle in the form of a fabric bag 4. Centrally of the casing 1 is a circular fan chamber 5, visible from the underside thereof and enclosing a fan 6, having direct driving connection with a motor (not shown) enclosed within a domelike cover or hood 7 surmounting the casing 1. The inlet to the fan chamber has the form of a circular opening or eye 5a and is located centrally of the bottom wall of the fan chamber and cencentric with the vertical axis of the fan and its driving motor. Surrounding the rear half of the fan eye 5a and extending forwardly towards the nozzle portion 2, with a slight outward flare, is a depending wall 8 curving abruptly through a right angle as it approaches the nozzle and forming the rear wall thereof at its outer ends. This depending wall forms the sides of a passage extending forwardly and communicating with the interior of the nozzle 2, said passage being closed at its bottom by a plate 9, having an upwardly facing marginal groove bearing against the bottom edge of the wall 8 and suitably lined with a resilient material to form an air tight seal. This bottom plate 9 is shaped to conform with the outline of the wall 8, and preferably comprises, as an integral part thereof, the bottom and surface contacting face of the nozzle portion 2, consisting of a pair of parallel lips 9a, 9a, connected at their ends by means of a pair of end lips 9b, 9b. These lips form the relatively wide suction mouth leading to the nozzle chamber immediately above and in which is located a rotating agitator 10, consisting of a cylindric shell having brush elements 10a, 10a, arranged lengthwise thereof and helically arranged beater elements 10b, 10b. The bottom plate 9 is removable to uncover the nozzle chamber and the passage leading rearwardly therefrom, being detachably held in place by a suitable latch member 11 at the extreme rear. Also enclosed within the passage from the nozzle chamber to the fan chamber is a drive belt 12 engaging a pulley 13 carried at the lower end of the fan shaft and which extending forwardly therefrom, engages a pulley groove 10c midway between the ends of the agitator 10 and immediately above a guard member 14. The latter extends transversely of the suction mouth, as clearly shown in Figure 2.

Again referring to the main casing 1, with its centrally disposed circular fan chamber 5, it will be noted that along the edges of the casing and extending rearwardly from the ends of the nozzle 2 are depending curvilinear walls 1a, 1a and between these depending marginal walls 1a, 1a, and the outer side walls of the fan chamber 5, are cavities or hollow spaces 15 which have a depth substantially equal to the height of the casing 1 itself. It is within these cavities enclosed by the marginal side walls 1a, 1a, of the casing, that the wheeled support for the casing and the nozzle adjusting mechanism associated therewith are located.

Referring first to the supporting means for the cleaner, the same comprises a common arrangement of carrier wheels 16, 16, journaled or supported just inwardly from the sides of the casing and immediately to the rear of the nozzle portion thereof, and a pair of wheels 17, 17 having more the character of a two-wheeled caster located beneath the rear end of the casting. In the present arrangement the front and rear wheels are not mounted separately upon the cleaner casing, as is the more common construction, but are carried on a separate frame member to form therewith a carriage or chassis which supports the entire cleaner. This carriage or chassis has two connections with the casing. One of these is a pivotal connection just forwardly of the rear caster assembly which permits the entire cleaner body to tilt about a horizontal axis. The other comprises an adjustable connection between the forward part of the chassis and the casing and includes an intermediate foot operated pawl and ratchet mechanism which functions to bring about the desired tilting of the cleaner body on the wheeled chassis and thus maintain the desired elevation of the nozzle above the carpet surface.

Figure 2:
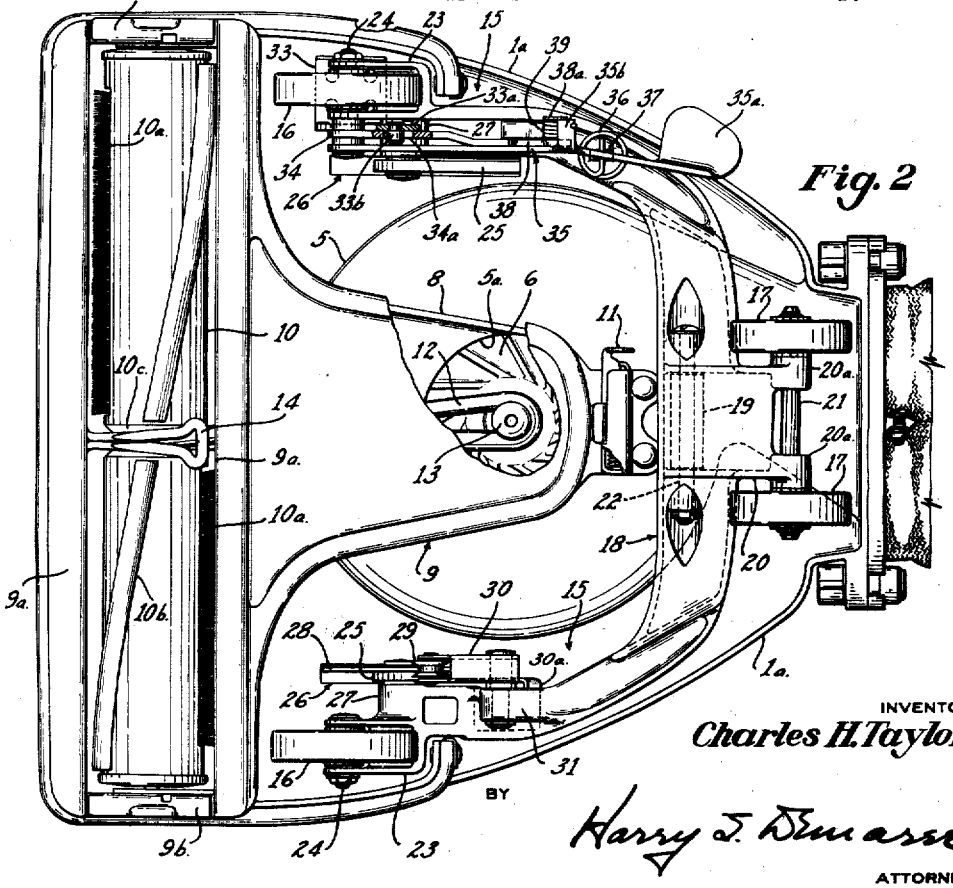
Figure 2 is a bottom plan view of the cleaner.

Referring particularly to the frame which forms the chassis or carriage, the same is a U-shaped casting 18, pivotally connected centrally of its base portion at the lower end of a bracket 19 depending from the underside of the fan chamber 5. The frame member has an integral bearing bracket 20 consisting in part of a pair of spaced transverse webs which straddle the supporting bracket 19, and of shaft seats 20a, 20a at the rearmost part thereof. At the outer end of the bearing bracket 20 and in the seats 20a, 20a is mounted a transverse axle 21 on which the rear wheels or casters 17, 17 are journaled. A pivot pin 22 passes horizontally and transversely through the supporting and bearing brackets 19 and 20, the underside of the frame member 18, being recessed as shown in Figure 2, to accommodate the enlarged ends of the bolt which serves as the pivot pin 22.

From the point of pivotal connection of the frame member 18 with the underside of the casing 1 the lateral extremities thereof curve forwardly within the cavities 15 between the wall of the fan chamber and the outer marginal walls 1a, 1a of casing 1. The extremities terminate just rearwardly of the transversely extending portions of the nozzle rear walls 8, 8 and in the form of fork members 23, 23. The front wheels 16, 16 are supported in the fork members 23, 23 being journaled on bearing shafts 24, 24.

Figure 4:
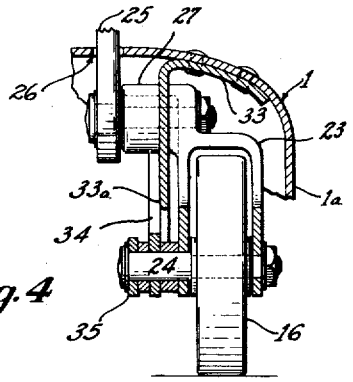
Figure 4 is a detailed view in vertical section taken on line 4—4 of Figure 1.
Figure 5:
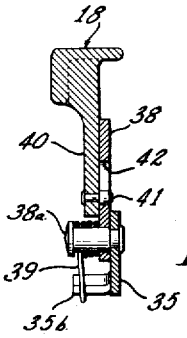
Figure 5 is also a detailed view in section taken on line 5—5 of Figure 1.

Pivotally connected to the chassis 18 just rearwardly of and above the front wheel supporting members 23, 23 are the ends of an inverted U-shaped bail member 25 which forms the lower extremity of the handle of the cleaner. The bail 25, after straddling the dome-like cover 7, projects downwardly through longitudinal slots 26, 26 in the top wall of the casing 1 to have its ends pivotally connected to laterally and inwardly extending bearing bosses 27, 27, integral with the innermost portion of the chassis frame 18 (Figure 4). Thus the cleaner handle is carried by the wheeled chassis and quite independently of the casing 1.

Figure 3:
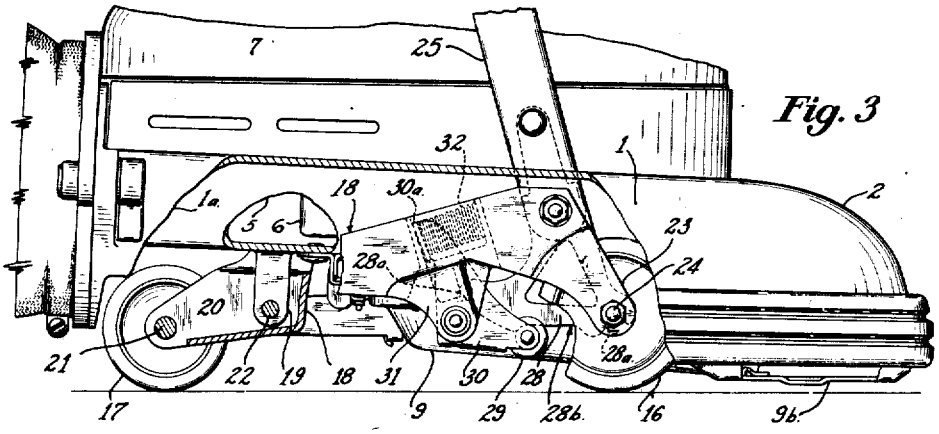
Figure 3 is also a view in side elevation of the cleaner, but of the opposite side from that of Figure 1.

Associated with the handle bail 25, and coacting with the chassis frame 18 on the side opposite the nozzle adjusting mechanism (Figure 3), is a handle position control device which serves to restrain the handle from free swinging movement and to define its extreme position as well as its intermediate or working range. This device is already in common use, except that in its present application the action is between a cam sector carried by the handle bail and a spring pressed roller mounted on the chassis instead of on the cleaner casing. Thus, as is clearly shown in Figure 3, the cam sector 28 is fixed to the end portion of the handle bail 25 on the side of the cleaner opposite the nozzle adjusting mechanism, said sector projecting below the bail end pivot and having along its arcuate lower edge three notches, the endmost notches 28a being semicircular in shape and the intermediate notch 28b being somewhat elongated. Bearing edgewise against the notched edge of the sector 28 is a cam roller 29 carried at the lower free end of a bell crank lever 30. The latter is pivotally mounted intermediate its ends at the lower extremity of a depending web 31, integral with the chassis frame 18, its upper portion or arm 30a above the pilot point projecting upwardly and forming an abutment for one end of a compression spring 32 suitably supported on the chassis frame 18. Manifestly, the spring acting through the lever 30 holds the roller 29 against the edge of the control sector 28, so that while it is possible to shift the handle from one position to another quite readily, the spring-pressed cam roller 29 holds the handle in that position against unintentional displacement.

Referring now to the semi-automatic nozzle height adjusting mechanism, attention is first directed to the fact that as thus far specifically described, the chassis frame 18 has direct connection with the casing 1 only at the point of pivotal connection just forwardly of the rear caster mounting. But, the cleaner casing in cleaner operation is not free to move vertically on this pivotal connection (limited as the arc would necessarily be), because of a second point of connection between the chassis frame 18 and the forward end of the cleaner casing, namely through a depending bracket 33 affixed to the top wall of the casing 1 and having a flat slightly curved arm 33a extending downwardly with a rearward curvature, as shown in Figure 2. This bracket 33 is mounted immediately above the right front carrier wheel 16 with its depending arm portion 33a extending downwardly immediately inside the forked wheel supporting member 23. There is, however, no direct connection between the adjacent end of the chassis frame 18 and the bracket 33, but instead an indirect connection through a link or ratchet sector 34 journaled on an extension of the same bearing shaft 24 that supports the carrier wheel 16.

As is clearly shown in Figure 1, the ratchet sector 34 has the form of an elongated triangular shaped plate pivoted at its apex and extending rearwardly therefrom with its bottom edge horizontal and its arcuate toothed edge facing rearwardly and adapted to be engaged by a pawl member presently to be described. This sector also has pin and slot connection, positioned intermediate its pivotal mounting on the bearing shaft 24 and its toothed edge, with the bracket arm 33a. The latter carries at its lower end a laterally projecting pin 33b which engages a relatively short slot 34a formed in the ratchet sector 34, the slot extending somewhat obliquely to the radial center line thereof. Thus it is apparent that the ratchet sector 34 provides a link between the chassis 18 and the casing 1 and that by rocking said sector vertically through a predetermined arc, a somewhat reduced rocking or tilting of the casing on its chassis will follow, the pin 33b being moved upwardly or downwardly depending upon the direction of movement of the sector.

Journaled upon the same bearing shaft 24 which carries the wheel 16 and the ratchet sector 34 is an operating lever 35. This lever 35 extends rearwardly just inside the ratchet sector 34 and normally in a substantially horizontal direction, its rear end terminating practically in line with the pivotal axis of the chassis frame 18 at which point it is provided with a foot pedal 35a projecting laterally from beneath the lower edge of the marginal wall 1a of the casing 1. The foot operated lever 35 is normally held in its substantially horizontal position and against downward movement by a relatively stiff coil spring 36 attached at one end to the lever just forwardly of its pedal extremity 35a and which extends vertically upwardly to be anchored at its upper end to a lug 37 depending from the under side of the chassis frame 18 immediately above.

Cooperating with the ratchet sector 34 is a pawl 38 which is pivotally mounted on the operating lever 35 substantially intermediate its ends and in the plane of said ratchet sector 34. A laterally projecting pin 38a supports the pawl 38 upon the lever 35 and, extending in a general upward and forward direction, is provided at its end with teeth 38b adapted to engage the teeth along the arcuate edge of the ratchet sector 34. A torsion spring 39, coiled around the pivot pin 38a with one end hooked around a lug 35b at the lower edge of the operating lever 35 and the other end around the back edge of the pawl 38 as is clearly shown in Figure 1, acts to yieldingly hold the pawl in engagement with the ratchet sector 34.

From the description of the pawl and ratchet mechanism to this point, it might be concluded that upon depressing, the lever 35, the pawl would click over the ratchet teeth and upon releasing the same, the forward end of the casing would be raised a given distance; in other words, that it is but the application of a typical pawl and ratchet adjustment. But this is not the case since such an arrangement would be only partially operative in that the nozzle could not be lowered, once it had been elevated to its extreme height, since there would be no way of releasing the pawl to allow the nozzle to be lowered. It is to be understood therefore, that the present adjusting mechanism is not to be confused with a foot operated ratchet device for elevating the nozzle but is, on the contrary, an adjusting mechanism which functions with but a single depression of the foot lever for setting the nozzle to the proper height for a particular surface. In other words, the depressing of the operating lever allows the nozzle to be lowered into contact with the carpet surface and upon releasing the lever the nozzle is elevated a predetermined fixed amount or distance regardless of the previous setting. But in order to bring this action about, it is necessary to control the movement of the pawl 38 with relation to the ratchet sector 34.

Figure 6:
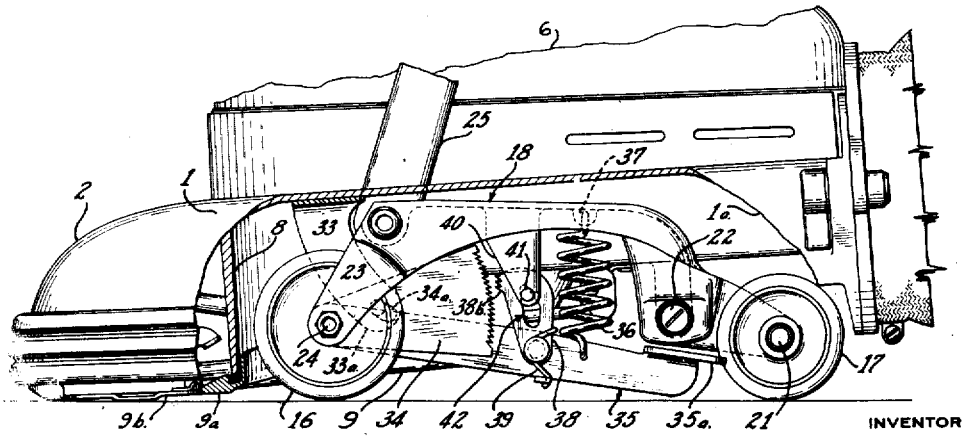
Figure 6 is a view in side elevation corresponding to Figure 1, but with the nozzle height adjusting mechanism shown with the parts thereof transposed by the depression of the actuating foot lever.

Thus, referring to Figure 6, there will be seen immediately above the pawl 38, an arm 40 depending from the under side of the chassis frame 18 and along the inner side of the pawl, said arm carrying a laterally projecting pin 41 engaging a somewhat irregularly shaped slot 42 located in the central portion of the pawl 38. This pin and slot connection serves to impart a cam action to the pawl, throwing it into and out of engagement with the ratchet sector 34 as it is raised and lowered, respectively, by movement of the actuating lever 35. More particularly, the cam action controls the pawl so that it disengages the ratchet sector at the beginning of the downward stroke of the lever 35 and holds it in that position (as in Figure 6) until the lever is released and starts its return upward movement whereupon the pawl is quickly thrown into engagement with the ratchet sector. That this cam action takes place is somewhat evident from the shape of the slot 42 in the pawl, being relatively wide at its lower end and converging toward its upper end thereby producing the oblique cam surface necessary to impart a quick lateral throw to the pawl as it shifts upwardly and downwardly with the operating lever 35.

Having thus set forth a structure embodying the improved nozzle adjusting mechanism, its operation will be understood from the following discussion:

Let it be assumed that the cleaner has been wheeled onto a carpet preparatory to operating it thereon and that so far as the nozzle height adjustment is concerned, it may or may not be properly set for that particular carpet, although the nozzle is elevated above the supporting surface as shown in Figure 1. Now, to obtain the correct setting the operator merely depresses the lever 35 to its fullest extent and upon releasing it the nozzle of the cleaner is automatically adjusted to the proper height regardless of previous setting.

The automatic action will now be described in detail: When the foot operated lever 35 is depressed from the substantially horizontal position shown in Figure 1 to the position shown in Figure 6, wherein the outer end practically contacts the carpet or floor surface, the first step is the disengaging of the pawl 38 from the ratchet sector 34, by the cam action of the stationary pin 41 in the slot 42 of the pawl 38. Immediately upon the release of the ratchet sector 34 by the pawl, the entire forward end of the cleaner casing 1 is free to tilt downwardly until the suction mouth of the nozzle rests flush upon the carpet surface, for obviously, having released the pawl sector 34 the casing can rotate freely about its pivotal connection with the chassis 18 and, the greater mass of the cleaner being forwardly of the pivotal axis, the nozzle simply drops into contact with the carpet surface.

But an important point to be noted here is that the bottom surface of the nozzle being made up of wide lips surrounding the suction mouth, affords a relatively large contact surface and of such area that there is no appreciable penetration or sinking of the nozzle into the nap or pile of the carpet. This is important because it is the plane of contact of the nozzle with the carpet that establishes the base from which the nozzle adjustment is made and this base will vary with the grade and type of carpet upon which the adjustment is made. For example, if the cleaner is resting on a bare floor or a hard surface covering such as linoleum, the depression of the foot lever 35 lowers the nozzle into contact with the surface and this surface coincides with the plane of contact of the wheels, because there is no surface penetration by either nozzle or wheels. But now assume that the cleaner is placed upon a rug or carpet having a definite nap. Manifestly, under the weight of the cleaner the wheels will sink to a certain depth into the nap and this will determine an apparent plane of contact lying somewhere between the tips of the carpet fibers and the underlying bare floor and will depend somewhat on the stiffness of the nap and the resiliency of the carpet backing. In other words, the plane of contact represented by the wheel treads may vary considerably in a vertical direction from the actual carpet surface, which for the purpose of this discussion may be assumed to be the plane determined by the end of the upstanding carpet fibers, commonly called the carpet pile. But when the nozzle is lowered into contact with the surface of a carpet or rug its extended area does not cause any appreciable penetration of the pile, whereas the wheels may sink the full depth of the pile. Thus it is that the plane established by the nozzle resting upon the carpet pile is above that established by the wheels, and regardless of the character of the carpet, comprises the base from which the nozzle adjustment takes place regardless of the depth of wheel penetration.

The vertical distance separating the base plane and the supporting wheel plane in the adjusting operation and with the lever 35 depressed is manifested in a slightly greater or less relative displacement of the chassis 18 and the cleaner casing 1 and this displacement is in turn reflected in the angular position of the ratchet sector 34 it having been released by the pawl 38, of course, as shown in Figure 6. This relationship follows from the fact that immediately upon the disengagement of the ratchet sector by the pawl the former is pivoted downwardly through an angle, which may be represented by one or more of the ratchet teeth, as the downward movement of the nozzle portion of the casing is transmitted thereto through the bracket 33 and more particularly through the pin and slot connection **33*b*, 34*a*. But with the base established by contact of the nozzle with the carpet, it is only necessary to release the operating lever 35, whereupon the spring 36 acts to retract the lever from the lowered position, illustrated in Figure 6, into normal horizontal position illustrated in Figure 1, the upward movement of the lever first throwing the pawl 38 into engagement with the ratchet sector 34, and thence swinging the latter upwardly in a counter-clockwise direction through a small arc, this movement of the ratchet sector 34 being transmitted to the casing through the bracket arm 33 with a slight degree of lost motion due to the pin and slot connection therebetween. It is to be noted that the lever 35 and the pawl 38 have definite ranges of movement and that regardless of the exact point on the teeth of sector 34 contacted by the pawl teeth 38*b*** the sector will be given the same angular rotation about its pivot point and so will produce the same vertical displacement of the nozzle above the base plane.

And finally, this upward lifting or elevating movement of the nozzle is previously determined for a particular type and style of cleaner and is constant regardless of varying surface conditions. For example, if $\frac{3}{32}$ of an inch is predetermined as the proper nozzle height setting for a particular cleaner, the adjusting mechanism is designed to raise the nozzle this distance above the surface of the carpet pile regardless of the type or character of the carpet.

Thus, to summarize the important features of the so-called semi-automatic nozzle adjustment, the first to be noted is that while the floor level determined by the plane of wheel contact is variable with different types and grades of carpets and rugs, the base plane from which the adjustment is made, is always established by the contact of the nozzle with the true carpet surface and that this plane coincides with the pile surface regardless of the kind and texture of the carpet. And secondly, having established this base plane from which the adjustment is to be made, the distance to which the nozzle is elevated above said plane is constant for that particular cleaner, so that the ultimate result is that regardless of the type of floor covering to be cleaned, the proper nozzle height setting is quickly and accurately obtained merely by depressing the foot pedal and then releasing it, the interconnection between the pawl carried by the operating lever and the tooth ratchet sector acting automatically to set the nozzle at its proper and correct height for the most effective and economical cleaning.

Thus, it follows that the adjustment is automatic insofar as it relieves the operator of the necessity for exercising any judgment as to the proper nozzle height adjustment for a particular carpet, this having previously been determined upon and incorporated in the design of the nozzle adjusting mechanism. Consequently, the only responsibility the operator has is to depress and release the pedal and the cleaner functions automatically to regulate or set its own height of nozzle adjustment for the particular carpet surface to be cleaned.

And finally, the incorporation of the nozzle adjusting mechanism in conjunction with a wheeled chassis supporting the cleaner casing so that the latter can be tilted to a slight angle about a transverse horizontal axis of pivotal connection, provides a very compact and satisfactory means of combining the supporting and adjusting mechanism. On the other hand, it is not essential that the cleaner body be supported upon a separate or independent carriage or chassis in order to obtain the automatic nozzle adjustment herein disclosed, providing either the forward or rear wheel mounting be pivotally connected to the casing of the cleaner. For example, in Figure 1, the rear caster mounting might readily be an integral part of the casing 1 rather than of the chassis frame 18, thus devoting the U-shaped frame member 18 to the mounting of the front wheels 16 and through which the elevating mechanism would still function quite as well to obtain the automatic adjustment of the nozzle.

Having thus set forth a preferred embodiment of my invention, I claim:

1. In a suction cleaner having a casing including a nozzle and a wheeled support having pivotal connection with said casing, means for adjusting the height of said nozzle above the surface to be cleaned comprising an adjustable link connecting said support with said casing independently of said pivotal connection and having a toothed sector, an operator actuated lever pivotally mounted on said wheel support adjacent said link, a spring-pressed pawl carried by said lever and normally having engagement with said sector to hold said link in adjusted position, and means acting to disengage said pawl and sector in the movement of said lever in one direction, thereby permitting said nozzle to be lowered into contact with said surface and to reengage said pawl and sector to effect the raising of said nozzle a predetermined distance above said surface during the movement of said lever in the opposite direction.

2. In a suction cleaner having a casing including a nozzle and a wheeled support having pivotal connection with said casing, means for adjusting the height of said nozzle above the surface of the carpet to be cleaned, comprising a ratchet sector pivotally carried by said support and having pin and slot connection with the underside of said casing at a point removed from its point of pivotal connection with said support, a foot-actuated operating lever mounted adjacent said ratchet sector, a spring-pressed pawl carried by said operating lever and normally engaging said ratchet sector to maintain said nozzle at a given height, means for shifting said pawl out of engagement with said ratchet sector in the movement of said operating lever in one direction thereby allowing said nozzle to drop into contact with the carpet surface, and to effect its re-engagement with said ratchet sector at the commencement of the return movement of said operating lever to elevate said nozzle to a predetermined distance above the carpet surface, and tension means acting to facilitate the return movement of said operating lever.

3. In a suction cleaner having a casing including a nozzle portion and a wheeled support pivotally connected to the underside of said casing and having wheels journaled thereon, means for adjusting said casing relative to said wheeled support to vary the height of said nozzle above the surface of the carpet to be cleaned, comprising an adjustable link connecting said casing with said wheeled support and provided with a toothed sector, a foot operated lever pivotally mounted on said wheeled support, a spring pressed pawl pivotally mounted on said lever and normally adapted to have toothed engagement with said sector, means acting to shift said pawl to release said sector during the depression of said lever thereby effecting the lowering of said nozzle into contact with the carpet surface and to allow the pawl to reengage said sector at the commencement of the return movement of the lever to effect the elevation of said nozzle to a predetermined height above said carpet surface, and tension means acting on said lever to impart the return movement thereto.

4. In a suction cleaner having a casing with a nozzle at its front end and a wheeled carriage extending lengthwise beneath said casing and pivotally connected therewith adjacent the rear end thereof, an adjustable ratchet sector connecting said casing with said wheeled carriage adjacent the front end of said casing, an operating lever pivotally mounted on said carriage adjacent said ratchet sector, a pawl pivotally mounted on said operating lever, tension means acting on said pawl to hold the same normally in toothed engagement with said sector, tension means acting on said operating lever to hold the same in its normal position wherein the nozzle portion of said casing is supported at a predetermined height above the floor level, and a cam acting on said pawl member during the movement of said operating lever in one direction to release said sector whereby said nozzle is permitted to drop into contact with the surface of the floor covering and, upon the subsequent release of said operating lever and its return to its normal position under the tension of said spring to re-engage said pawl with said sector and thereby actuate said link to raise said nozzle a predetermined fixed distance above the surface of said floor covering.

5. In a suction cleaner having a body including a nozzle and a wheeled support having pivotal connection with the underside of said casing, a link connecting said support with said casing whereby the vertical rocking movement of said link imparts a tilting movement to said casing to raise and lower said nozzle, means normally holding said link against movement including a spring-pressed link-engaging member, a spring-actuated lever operatively connected with said link-engaging member, a fixed cam member acting to shift said link-engaging member in a direction to disengage said link in the movement of said lever against the tension of its spring thereby to cause said nozzle to drop downwardly into contact with the carpet surface and to effect the re-engagement of said link by said link-engaging member at the moment said lever is released and commences its return stroke under the tension of its spring, thereby raising said nozzle to a predetermined height above the carpet surface.

6. In a suction cleaner having a body including a nozzle and a wheeled support pivotally connected to said body, a link also pivotally connecting said body with said support and having a ratchet sector, a spring-pressed pawl normally engaging said ratchet sector, a lever carrying said pawl and adapted to be shifted in opposite directions, said pawl having pin and slot connection with said support whereby it is disengaged from said ratchet sector during the movement of said lever in one direction and into engagement with said ratchet sector at the commencement of the movement of said lever in the opposite direction, whereby said nozzle is lowered into contact with the surface of the floor covering to be cleaned and thence raised to a predetermined height above said surface.

7. In a suction cleaner having a body including a nozzle and a wheeled support pivotally connected to said body, a link connecting said body with said support and having a toothed ratchet sector, a spring-pressed pawl normally engaging said ratchet sector to maintain said body in fixed relation to said support, and mechanism for operating said pawl successively to release said ratchet sector thereby to permit said body to drop under its own weight until said nozzle contacts the floor and to re-engage said ratchet sector and raise said nozzle to a predetermined height above the floor.

8. In a suction cleaner having a body including a nozzle and a wheeled support pivotally connected with said body, a ratchet member pivotally connecting said wheeled support with said body at a point spaced from the first mentioned point of pivotal connection, a pawl normally engaging said ratchet member to maintain said body in fixed relation with said support, an operating lever mounted on said support and having operative connection with said pawl, and means for shifting said pawl out of engagement with said ratchet member in the movement of said lever in one direction thereby permitting said body to drop downwardly with said nozzle resting on the surface of the floor covering to be cleaned and thence into engagement with said ratchet member at the commencement of the return stroke of said lever to raise said body to a height predetermined by the movement of said ratchet member during the return stroke of said lever.

9. In a suction cleaner having a casing including a nozzle and a wheeled support having pivotal connection with said casing, means for adjusting the height of said nozzle above the surface to be cleaned, comprising a link connecting said wheeled support with the nozzle end of said casing and having a ratchet sector, a lever pivotally mounted on said wheeled support, a spring-pressed pawl carried by said lever and normally engaging said ratchet sector to hold said link against displacement, said pawl being cam controlled to disengage said pawl from said ratchet sector in the movement of said lever in one direction to allow said nozzle to drop into contact with the surface to be cleaned and to re-engage said sector at the commencement of the return stroke of said lever and elevate said nozzle to a predetermined height above said surface.

10. In a suction cleaner having a casing including a nozzle and a wheeled support having pivotal connection with said casing, means for adjusting the height of said nozzle relative to the surface to be cleaned comprising a link connecting said wheeled support with said casing and provided with a ratchet sector, an operating lever pivotally mounted on said support, a pawl carried by said lever and normally engaging said ratchet sector to hold said nozzle in a given position of adjustment, a cam mounted on said support and acting to shift said pawl to release said ratchet sector in the movement of said lever in one direction and permit said nozzle to drop into contact with the floor surface and to shift said pawl into engagement with said sector at the commencement of the return stroke of said lever and elevate said nozzle to its predetermined height above the surface to be cleaned.

11. In a suction cleaner having a casing including a nozzle and supported upon a carriage having pivotal connection with the underside of said casing, means for adjusting the height of said nozzle above the surface to be cleaned, comprising a link pivotally connecting said carriage with said casing adjacent the nozzle end thereof and provided with a ratchet sector, an operating lever pivotally mounted on said carriage, a spring-pressed pawl carried by said operating lever and normally engaging said ratchet sector to hold said casing in a fixed relation to said carriage, a fixed cam member on said carriage and engaging a slot in said pawl to shift the same out of engagement with said ratchet sector upon the movement of said operating lever in one direction thereby permitting said nozzle to drop into contact with the carpet surface and to shift said pawl into re-engagement with said ratchet sector at the commencement of the movement of said operating lever in the opposite direction thereby to raise said nozzle to a predetermined height above the surface to be cleaned.

12. In a suction cleaner having a casing and provided with a nozzle at its forward end and a wheeled carriage pivotally connected to its underside adjacent its rear end, a link having a ratchet sector and connecting said carriage with said body adjacent said nozzle and adapted to swing in a vertical plane to vary the height of the nozzle above the surface to be cleaned, a foot-actuated lever pivotally mounted on said carriage, a spring acting on said lever to yieldingly oppose its depression, a spring-pressed pawl mounted on said lever and normally engaging the ratchet sector on said link to hold said casing in a fixed position of nozzle height adjustment, a cam acting on said pawl to shift the same out of engagement with said ratchet sector upon the depression of said lever thereby permitting said nozzle to drop into contact with the carpet surface and to re-engage said pawl with said ratchet sector at the commencement of the return movement of said lever and thereby raise said nozzle to a predetermined height above said surface.

13. In a suction cleaner, a nozzle having surface contacting lips of an area sufficient to support the nozzle upon a surface covering with substantially no sink, means to support said nozzle above and for movement over a surface covering undergoing cleaning, and means which require no judgment from the user but only an actuating force to position said nozzle at an optimum height above said covering including cooperating relative adjustable means, one of said means being connected to said nozzle and movable upon the vertical movement thereof, a second of said means normally in engagement with said first-mentioned means and being constructed and arranged to disengage said first-mentioned means to allow said nozzle to move into contact with and rest upon a supporting surface and being movable to engage and move said first-mentioned means to raise said nozzle a predetermined distance above said covering as determined by said lips, and lever means to actuate said second means.

14. In a suction cleaner, a body having a nozzle, said nozzle including surface contacting lips of an area sufficient to support said nozzle substantially on the top of a surface covering, means to support said body for movement over a surface covering and adapted to sink into that covering under the cleaner weight, cooperating means acting independently of the judgment of the user and requiring only an actuating force to raise said nozzle to an optimum height above a surface covering undergoing cleaning from a base position thereon, engageable and disengageable means included in said last-mentioned means constructed and arranged to disengage to drop said nozzle to rest on said covering in said base position under the actuation of an outside force and to re-engage with said nozzle in said base position, said means to raise said nozzle also including means to effect conjoint movement of said engageable and disengageable means to raise said nozzle after re-engagement in said base position.

15. In a suction cleaner, a nozzle, means to support said nozzle upon a surface covering undergoing cleaning, cooperating means to fix the operating position of said nozzle above a surface covering undergoing cleaning independent of the judgment of the operator and including first means connected to said nozzle and movable upon the vertical movement thereof and including second means normally fixing the position of said first means and said nozzle and being disengageable from said first means, to enable said nozzle to support itself upon a surface undergoing cleaning and to position said first means, said second means being selectively engageable with said first means in its position thereof as determined by the nozzle when resting upon the surface covering, said second means being movable in a path within limits which are the same for all positions of said first means to move said first means after becoming engaged therewith to raise said nozzle to an optimum operating position above said surface covering.

16. In a suction cleaner a body including a nozzle, means to support said nozzle upon a surface covering, and means to fix independently of the judgment of the operator the relative positions of said nozzle and said supporting means and so the relative position of said nozzle to a surface covering undergoing cleaning and comprising a first means connected to and movable upon the vertical movement of said nozzle and a second means movable within fixed limits in a predetermined path relative to said first means and selectively engageable therewith in any of a plurality of positions thereof as determined by said nozzle when resting on a surface covering, operator-operated means to receive an unmeasured force to disengage and hold said first and second means in disengagement to enable said nozzle to move into contact with and rest upon said surface covering thereby positioning said first means, and to re-establish the engagement of said first and second means and to exert a force on said second means to move said first means within said fixed limits in said predetermined path to position said nozzle at a predetermined height above its position at rest upon said covering.

17. In a suction cleaner, a nozzle, means to support said nozzle upon a surface covering undergoing cleaning, cooperating means to fix the operating position of said nozzle above a surface covering undergoing cleaning independently of the judgment of the operator and including first means operatively connected to said nozzle and movable therewith and thereby when moving vertically and including second means selectively engageable with said first means and normally fixing the position thereof and of said nozzle and being disengageable from said first means, operator-operated means to displace said second means from said first means to release said nozzle to permit it to rest upon a surface covering undergoing cleaning, said second means being movable into re-engagement with said first means in a relationship as determined by the position of said first means as determined by said nozzle when resting on said covering, said second means being further movable a predetermined distance after re-engagement with said first means to exert a force therethrough to lift said nozzle a predetermined distance above said surface covering.

18. In a suction cleaner of the type having a body with a nozzle and surface contactable means to support said body while resting substantially on the top plane of a surface covering, and ambulatory means supporting said body with said nozzle upon a surface undergoing cleaning, means to control the operating height of said nozzle above said surface including clutch means to disconnect said body and said ambulatory means to enable said body to lower into surface-contacting position at said surface-contactable means from any height thereabove and means to raise said body in a single step to a predetermined optimum height at said nozzle upon the reengagement of said clutch means, and force-receiving means to receive a uni-directional force from the operator to open said clutch and to store energy in said last-mentioned means.

19. In a suction cleaner of the type having a body with a nozzle and wheels adjustably connected thereto and adapted to support said body movably upon a surface covering undergoing cleaning, said wheels having a surface-contacting area such that they sink into the pile of a supporting surface covering and to various distances depending upon the characteristics of the covering, said body having a surface-contacting area adapted to contact and rest upon the top of the pile of a surface covering with substantially no penetration, means to position said nozzle at an optimum operating height above said surface covering including relatively adjustable elements interconnecting said wheels and said body and positioned for operative engagement by said wheels and by said body with the latter resting on said surface-contacting area, operator-operated means requiring no judgment but only an actuating force to disconnect said elements to enable said body to lower into a resting position upon said surface-contacting area and to re-establish connection between said elements as positioned for operative engagement to raise said body a predetermined distance at said nozzle above its position when supported by said surface-contacting area.

20. In a suction cleaner, a body having a nozzle and a surface-contactable area of sufficient size as to rest upon the top of the pile of a surface covering, a wheel adapted to support at least a part of the weight of said body and to penetrate into the pile of a surface covering under that load, and means to adjust the position of said wheel relative to said body and to retain the wheel in a fixed position relative thereto, said means including a plurality of engageable elements between said body and said wheel arranged for selective connection and limited conjoint movement after connection to raise said body a predetermined distance on said wheel, the relative positions of said elements being determined at the instant of engagement by the relative positions of said body and said wheel when the former is supported upon said surface-contactable area, and said means including means to separate said elements, join said elements, and move said elements after their connection.

21. In a suction cleaner, a body having a surface-cleaning suction nozzle, a surface-contactable area to support said body when standing without movement and of sufficient size to rest substantially upon the top of a surface covering, a wheel to support said body for movement over said covering and having an area such that when supporting its share of the cleaner weight it penetrates said covering, operator-operated means connected to said wheel requiring no judgment but only an actuating force to select said area or said wheel for body-supporting operation and including means to raise automatically said body a predetermined distance at said nozzle above its position when supported by said surface-contactable area and into optimum cleaning relationship to a supporting surface upon placing said wheel into operation, said construction being characterized in that said actuating force is transmitted to said covering through said wheel and not through said body.

22. The construction defined in the preceding claim characterized in that said surface-contactable area comprises the surface-contacting area of the mouth of said nozzle.

23. In a suction cleaner, a body having a nozzle, first means to determine by contact the top of a supporting surface covering, supporting means adapted to sink into a supporting surface and to support said body thereabove, and second means connected between said body and said supporting means to raise said body at said nozzle and on said supporting means a predetermined distance above the top of said covering under the impetus of an unmeasured force requiring no judgment of the operator, said second means including an adjustable element connected to and positioned by said first means with the latter in contact with a surface covering and also including an operator-operated element constructed and arranged as to engage said adjustable element while positioned by said first means and to exert a nozzle-raising force thereon.

24. In a suction cleaner, a body including a nozzle, supporting wheels adapted to sink to different depths in surface coverings of differing characteristics and adjustably connected to said body to support said nozzle at various heights above a surface covering undergoing cleaning, clutch means between said body and said wheels to render said wheels operative or inoperative as supports for said nozzle and including an adjustable part and an operator-controlled part, a surface-contacting member adapted to contact an underlying surface covering substantially without sink to position said adjustable part with said wheels inoperative as supports, and means to move said operator-controlled part to engage said adjustable part and close said clutch and by further movement to move said adjustable part to raise said nozzle to an optimum operating position.

25. In a suction cleaner, a nozzle, a support for said nozzle, and means to position said support relative to said nozzle in accordance with the character of the supporting surface to provide an optimum operating height for said nozzle above said covering, said means comprising a plurality of engageable elements mounted for relative and for conjoint movements, said elements in their engaged relationship rendering said support operative and in their disengaged relationship rendering said support inoperative and enabling the nozzle to rest upon a supporting surface substantially on the top thereof, one of said elements being positioned by said nozzle and the relationship of said elements at their instant of engagement being determined by the position of said nozzle when resting upon said surface, and pedal means reciprocable between two positions independent of nozzle position, present or intended, to exert an energizing force to effect the disengagement of said parts, their re-engagement, and their conjoint movement after re-engagement.

26. In a suction cleaning, a body including a nozzle, supporting wheels adjustably connected to said body at a distance from their axis of rotation, clutch means to render said wheels operative or inoperative as supports for said nozzle and to raise said nozzle on said wheels, means on said body to determine the top plane of an underlying surface covering to be cleaned with said wheels inoperative as supports and conditioning the parts of said clutch for engagement, and operator-operable means adapted to receive an unmeasured force to close said clutch as conditioned by said last-mentioned means and to raise said nozzle independently of the judgment of the operator as to the proper height.

27. In a suction cleaner, a body including a surface-cleaning nozzle, gauge means movable to contact an underlying surface covering but normally inoperative as such to determine the plane of the top of a supporting surface, a support for said body adjustable relative thereto and adapted to sink into a supporting surface covering and to carry said nozzle above said plane, operator-operated means to actuate said gauge to determine said plane and incapable of controlling the degree or extent of nozzle adjustment, and interconnecting means between said support and said body including an adjustable part positioned by said gauge to render said support operative as a support with said nozzle at a predetermined height as determined by said part and under an energizing force received from said operator-operated means.

28. The construction recited in the preceding claim characterized in that said gauge is forced against the top of an underlying surface covering.

CHARLES H. TAYLOR.

CERTIFICATE OF CORRECTION.

Reissue No. 22,594. January 23, 1945.

CHARLES H. TAYLOR.

It is hereby certified that error appears in the printed specification of the above numbered patent requiring correction as follows: Page 2, first column, line 57, for "casting" read --casing--; page 7, first column, line 40, claim 15, for "its" read --any--; and that the said Letters Patent should be read with this correction therein that the same may conform to the record of the case in the Patent Office.

Signed and sealed this 27th day of November, A. D. 1945.

Leslie Frazer (Seal) First Assistant Commissioner of Patents.